United States Patent
Andersen et al.

(10) Patent No.: US 10,961,871 B2
(45) Date of Patent: Mar. 30, 2021

(54) METHOD OF EXTENDING THE USEFUL LIFE OF AN AGED SCR CATALYST BED IN AN EXHAUST SYSTEM OF A STATIONARY SOURCE OF NOX

(71) Applicant: Johnson Matthey Public Limited Company, London (GB)

(72) Inventors: Paul Andersen, Audubon, PA (US); Kevin Doura, Audubon, PA (US); Cindy Khalaf, Alpharetta, GA (US); David Repp, Alpharetta, GA (US); Thomas Yeh, Audubon, PA (US)

( * ) Notice: Subject to any disclaimer, the term of this patent is extended or adjusted under 35 U.S.C. 154(b) by 0 days.

(21) Appl. No.: 16/465,600

(22) PCT Filed: Nov. 29, 2017

(86) PCT No.: PCT/GB2017/053599
§ 371 (c)(1),
(2) Date: May 31, 2019

(87) PCT Pub. No.: WO2018/100368
PCT Pub. Date: Jun. 7, 2018

(65) Prior Publication Data
US 2019/0383174 A1    Dec. 19, 2019

Related U.S. Application Data

(60) Provisional application No. 62/428,589, filed on Dec. 1, 2016.

(51) Int. Cl.
F01D 25/30    (2006.01)
F01N 13/00    (2010.01)
(Continued)

(52) U.S. Cl.
CPC ........... *F01D 25/305* (2013.01); *F01N 3/106* (2013.01); *F01N 3/2066* (2013.01);
(Continued)

(58) Field of Classification Search
CPC ...... F01N 3/106; F01N 3/2066; F01N 13/009; F01N 2370/02; F01N 2370/04;
(Continued)

(56) References Cited

U.S. PATENT DOCUMENTS

2007/0110643 A1    5/2007 Sobolevskiy et al.
2014/0260199 A1    9/2014 Grzesiak et al.
(Continued)

FOREIGN PATENT DOCUMENTS

GB    2538132 A    11/2016
WO    2008132452 A2    11/2008
(Continued)

*Primary Examiner* — Audrey K Bradley
*Assistant Examiner* — Dapinder Singh

(57) ABSTRACT

A method of extending the useful life of an aged selective catalytic reduction (SCR) catalyst bed, which catalyses the conversion of oxides of nitrogen ($NO_x$) to dinitrogen ($N_2$) in the presence of a nitrogenous reductant, in the exhaust gas after treatment system of a stationary source of $NO_x$ so that the exhaust gas emitted to atmosphere from the system continues to meet proscribed limits for both $NO_x$ and ammonia emissions, which method comprising the step of retrofitting an additional honeycomb substrate monolith or a plate-type substrate comprising a catalyst (ASC) for converting ammonia in exhaust gas also containing oxygen to nitrogen and water downstream of the aged SCR catalyst bed, wherein the $kNO_x$ of the honeycomb substrate monolith comprising the catalyst for converting ammonia in exhaust gas also containing oxygen to nitrogen and water is greater than or equal to 80 m/hr between 300 and 400° C. inclusive, wherein kNOx of a sample of the catalyst, which has been aged at 450° C. in 10% $H_2O$ (as steam) in air for 48 hours, is determined by a SCR activity test in a laboratory scale reactor using a gas composition of 50 ppm CO, 30 ppm NO, 36 ppm $NH_3$, 15% $O_2$, 8% water, 3% $CO_2$, balance $N_2$.

22 Claims, 1 Drawing Sheet

Figure 1:
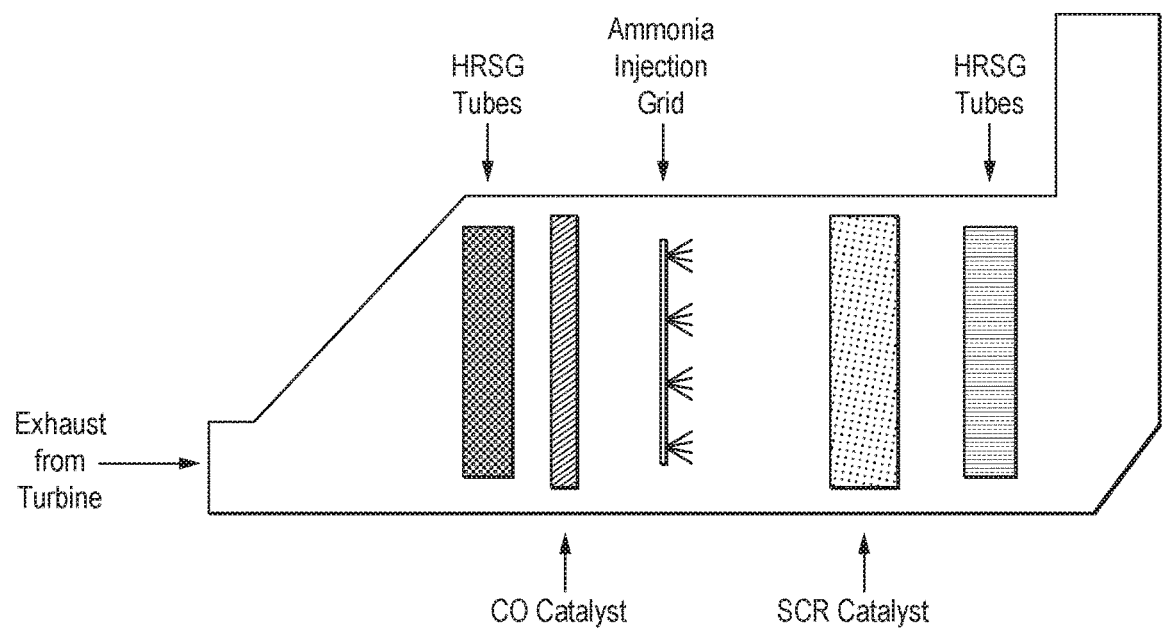

(51) Int. Cl.
*F01N 3/10* (2006.01)
*F01N 3/20* (2006.01)

(52) U.S. Cl.
CPC ........ *F01N 13/009* (2014.06); *F01N 2370/04* (2013.01); *F01N 2450/40* (2013.01); *F01N 2570/18* (2013.01); *F01N 2590/10* (2013.01); *F01N 2610/02* (2013.01)

(58) Field of Classification Search
CPC ............ F01N 2450/40; F01N 2570/18; F01N 2590/10; F01N 2610/02; F01D 25/305; Y02T 10/12; Y02T 10/16
USPC .................................. 60/274, 295, 299–301
See application file for complete search history.

(56) References Cited

U.S. PATENT DOCUMENTS

| | | | |
|---|---|---|---|
| 2015/0151251 A1* | 6/2015 | Gaudin | ................... F01N 3/208 423/212 |
| 2016/0245139 A1 | 8/2016 | Repp | |
| 2016/0256823 A1 | 9/2016 | Devarakonda | |
| 2016/0367974 A1* | 12/2016 | Larsson | ................. F01N 3/106 |
| 2016/0367975 A1* | 12/2016 | Lu | ......................... F01N 3/2066 |

FOREIGN PATENT DOCUMENTS

| | | |
|---|---|---|
| WO | 2011045252 A1 | 4/2011 |
| WO | 2014083431 A2 | 6/2014 |
| WO | 2014085354 A1 | 6/2014 |
| WO | 2015017516 A2 | 2/2015 |

* cited by examiner

METHOD OF EXTENDING THE USEFUL LIFE OF AN AGED SCR CATALYST BED IN AN EXHAUST SYSTEM OF A STATIONARY SOURCE OF NOX

The present invention relates to a method of extending the useful life of an aged selective catalyst reduction catalyst bed in an exhaust system of a stationary source of $NO_x$.

Modern electric power generators fuelled by natural gas, light distillates or syngases (derived e.g. from coal) operate combined cycle gas turbines, in which the gas is combusted in a gas turbine to generate electricity in a first cycle and heat generated from combustion of the gas is recovered in a steam-operated heat engine in a second cycle. The combination of these two cycles increases the net overall efficiency of the system. The second cycle is typically conducted in what is known as a Heat Recovery Steam Generator (HRSG) system, which typically also includes catalytic components for treating components including oxides of nitrogen ($NO_x$), carbon monoxide (CO) and unburned hydrocarbons (HC) in the exhaust gas resulting from the combustion of the gas in the first cycle. Catalytic activity of these catalytic components is promoted by transfer of the heat of the exhaust gas being treated to the catalytic components themselves. Location of the catalytic components within the HRSG system can be selected for temperature-optimised catalytic activity.

Emission of NOx from stationary sources, primarily from power stations, industrial heaters, cogeneration plants including wood-fired boilers, stationary diesel and gas engines, marine propulsion engines, diesel locomotive engines, industrial and municipal waste incinerators, chemical plants and glass, steel and cement manufacturing plants represents a major environmental problem. NOx leads to the formation of ozone in the troposphere, the production of acid rain and respiratory problems in humans. NOx is formed thermally in the combustion process by combination of the $N_2$ and $O_2$ present in the air. At temperatures greater than about 1,500° C., this reaction proceeds at appreciable rates through a well-characterised mechanism called the Zeldovich mechanism.

In order to meet NOx emissions standards specified by various regulatory agencies, methods of after-treatment of exhaust (flue) gases are required. Among such after-treatment methods, the selective catalytic reduction (SCR) method is the best developed and most used world-wide for the control of $NO_x$ emissions from stationary sources due to its efficiency, selectivity (to $N_2$ product) and economics. The SCR reaction generally consists of the reduction of $NO_x$ by ammonia ($NH_3$) to form water and nitrogen.

The major reactions involved in SCR $NO_x$ reduction are shown in reactions (1), (2) and (3):

$$4NO+4NH_3+O_2 \rightarrow 4N_2+6H_2O \quad (1)$$

$$6NO_2+8NH_3 \rightarrow 7N_2+12H_2O \quad (2)$$

$$NO+NO_2+2NH_3 \rightarrow 2N_2+3 H_2O \quad (3)$$

Three types of catalysts that promote reactions (1)-(3) inclusive have been developed: noble metals, metal oxides and metal promoted zeolites. Noble metal SCR catalysts are primarily considered for low temperature and natural gas applications, because they can undesirably promote $SO_2$ oxidation at above about 200° C.

Among the various metal oxide SCR catalysts developed for 300-400° C. applications, vanadia supported on titania in the anatase form and promoted with tungsta or molybdena was found to resist sulfation and to have low activity for the $SO_2$ oxidation reaction.

Commercial zeolite SCR catalysts for the treatment of stationary source $NO_x$ emissions include mordenite (see R. H. Heck et al, "Catalytic Air Pollution Control—Commercial Technology", $3^{rd}$ Edition (2009) John Wiley & Sons, Inc. Hoboken, N.J.). See in particular Chapter 12.

Fe-promoted zeolite catalysts have been proposed for SCR primarily for use in gas-fired cogeneration plants at high temperatures, i.e. up to 600° C., where metal oxide catalysts can be thermally unstable.

The commercial SCR catalysts are deployed in the form of extruded honeycomb monoliths, plates or as coatings on inert honeycomb monoliths.

For a more complete description of the background to the application of the SCR method to stationary sources of $NO_x$ emission, please see P. Forzatti, App. Cat A: General 222 (2001) 221-236.

Reaction (3) is known to be a relatively fast reaction compared to either reaction (1) or in particular reaction (2), and so is preferred. A suitable oxidation catalyst disposed upstream of the SCR catalyst for this purpose is also relevant for treating CO and HC components in the exhaust gas. Reductant injection upstream of the SCR catalyst is generally done downstream of the oxidation catalyst to avoid inefficient consumption of ammonia (by oxidation to NOx), with consequent reduction of overall system conversion performance. Ammonia injection can be done via a suitable apparatus, such as an ammonia injection grid (AIG).

Although any of the above SCR catalysts can be used to treat NOx in a HRSG system, gas combustion exhaust gas temperatures generally require that the above-mentioned metal oxide or metal promoted zeolites are appropriate.

Gas turbine emission control systems generally include a CO oxidation catalyst (CO-Ox) followed by an ammonia injection grid (AIG) and finally an SCR catalyst bed (SCR). As the catalyst system ages, CO conversions drop and SCR performance deteriorates. To maintain system overall NOx emissions to at or below a pre-defined minimum, the plant operator increases the ammonia:NOx ratio to continue to drive reactions (1), (2) and (3). However, this increases ammonia emissions ("slip") and increases the cost of operation through consumption of reductant. Ammonia slip refers to emissions of unreacted ammonia that result from incomplete reaction of the NOx and the reductant. Ammonia slip may cause formation of ammonium sulfates, which can plug or corrode downstream components and contribute undesirably to particulate matter (PM2.5) emissions to atmosphere. In the U.S., permitted ammonia slip levels are typically 2 to 10 ppm.

Eventually, the SCR catalyst activity deteriorates to the point where the ammonia:NOx ratio can no longer be increased without exceeding the pre-defined maximum. At this point, typical practice is to remove and dispose of the spent catalysts and replace with new catalyst so that the system is able to remain compliant with emission standards.

The inventors have now discovered, very surprisingly, that the ability of an end-of-life SCR catalyst bed in an exhaust system of a gas turbine to treat NOx to within proscribed limits can be extended by up 50% without exceeding proscribed $NH_3$ slip limits by retrofitting a catalyst for treating ammonia slip (referred to as an ammonia slip catalyst or "ASC" herein) downstream of the end-of-life SCR catalyst bed more economically than by replacing the end-of-life SCR catalyst itself. This discovery has the considerable advantage that the benefit can be obtained using a relatively small catalyst volume compared with the SCR catalyst bed volume and consequently additional backpressure added to the system is negligible and does not significantly affect overall power generation efficiency.

According to one aspect, the invention provides a method of extending the useful life of an aged selective catalytic reduction (SCR) catalyst bed, which catalyses the conversion of oxides of nitrogen ($NO_x$) to dinitrogen ($N_2$) in the presence of a nitrogenous reductant, in the exhaust gas after treatment system of a stationary source of $NO_x$ so that the exhaust gas emitted to atmosphere from the system continues to meet proscribed limits for both $NO_x$ and ammonia emissions, which method comprising the step of retrofitting a honeycomb substrate monolith or a plate-type substrate comprising a catalyst for converting ammonia in exhaust gas also containing oxygen to nitrogen and water downstream of the aged SCR catalyst bed, wherein the $kNO_x$ of the honeycomb substrate monolith comprising the catalyst for converting ammonia in exhaust gas also containing oxygen to nitrogen and water is greater than or equal to about 80 m/hr between about 250 and about 400° C. inclusive, wherein $kNO_x$ of a sample of the catalyst, which has been aged at 450° C. in 10% HzO (as steam) in air for 48 hours, is determined by a SCR activity test in a laboratory scale reactor using a gas composition of 50 ppm CO, 30 ppm NO, 36 ppm $NH_3$, 15% 02, 8% water, 3% $CO_2$, balance Nz.

The invention provides a number of significant advantages. The useable life of the SCR catalyst can be extended by up to two times. This promotes sustainable use of resources in that the relatively large SCR catalyst volume does not have to be recycled or sent to landfill for a significant period of time.

In practice, the relatively small volume of the retrofitted honeycomb substrate monolith or plate-type substrate comprising the catalyst for converting ammonia in exhaust gas also containing oxygen to nitrogen and water is just one of the factors enabling the retrofitted catalyst to be manufactured at a lower cost than the replacement cost of the SCR catalyst. The cost of the retrofitted catalyst can be more than 20% cheaper than the SCR catalyst replacement cost.

An ammonia slip catalyst is designed selectively to promote the following overall reaction:

$$4NH_3 + 3O_2 \rightarrow 2N_2 + 6H_2O \quad (4)$$

As described in greater detail hereinbelow, US patent application publication nos. 2007/0110643 A1, 2016/0245139 A1 and 2016/0256823 A1 propose the use of an ammonia slip catalyst (also known as an ammonia oxidation ("AMOX") catalyst) downstream from or in combination with a SCR catalyst in an exhaust system of a gas turbine engine.

However, electric power generation plant operators generally do not include ammonia slip catalysts downstream from newly installed SCR catalyst beds because the SCR catalyst bed is able to convert NOx at negligible ammonia slip and in any event it is permitted to emit relatively low levels of ammonia to atmosphere, as described hereinabove. Therefore, the addition of an ammonia slip catalyst in the systems proposed by these publications is unnecessary and undesirably increases the economic cost and burden to the plant operator of installing the system.

US patent application publication no. 2007/0110643 A1 discloses an exhaust gas treatment apparatus for reducing the concentration of NOx, HC and CO in an exhaust gas stream such as produced by a gas turbine engine of a power generating station. The treatment apparatus includes a multifunction catalytic element having an upstream reducing-only portion and a downstream reducing-plus-oxidizing portion that is located downstream of an ammonia injection apparatus. The selective catalytic reduction (SCR) of NOx is promoted in the upstream portion of the catalytic element by the injection of ammonia in excess of the stoichiometric concentration, with the resulting ammonia slip being oxidized in the downstream portion of the catalytic element. Any additional NOx generated by the oxidation of the ammonia is further reduced in the downstream portion before being passed to the atmosphere.

US patent application publication no. 2016/0245139 A1 discloses an exhaust system for a power generating apparatus comprising a heat source for combusting a fuel in air to produce power, which exhaust system being adapted to receive a flowing exhaust gas and comprising a catalyst system for treating the exhaust gas, which catalyst system comprising a first oxidation catalyst and a second catalyst, wherein the first oxidation catalyst is positioned downstream from the heat source so that the flowing exhaust gas contacts the first oxidation catalyst before the second catalyst.

US patent application publication no. 2016/0256823 A1 discloses a system including a nitrogen oxide reduction catalyst fluidly coupled to an exhaust conduit of an engine system. The nitrogen oxide reduction catalyst is configured to reduce nitrogen oxides in an engine exhaust. The system also includes an ammonia oxidation catalyst fluidly coupled to the exhaust conduit downstream of the nitrogen oxide reduction catalyst and configured to reduce ammonia in the engine exhaust. Further, the system includes a reductant injection control system configured to control an injection of reductant into the exhaust conduit, determine a first nitrogen oxide conversion rate of the nitrogen oxide reduction catalyst, determine an ammonia storage value of the nitrogen oxide reduction catalyst, and determine a first temperature of the engine exhaust upstream of the ammonia oxidation catalyst. The reductant injection control system is also configured to increase or decrease the injection of reductant based on the first nitrogen oxide conversion, the ammonia storage value, and the first temperature.

US patent publication no. 7727499 discloses a method for removal by oxidation of the excess ammonia ($NH_3$) gas ("ammonia slip") resulting from flue and exhaust gases that have been subjected to selective catalytic reduction (SCR) for reduction of nitrogen oxides ($NO_x$) with ammonia. More specifically, the method uses an ammonia oxidation catalyst consisting of a zeolite, one or more precious metals, and a base metal compound, to catalyze the oxidation of both ammonia and carbon monoxide (CO), while minimizing the formation of nitrogen oxides (NOx).

The rate constant kNOx is defined as follows:

Rate constant($kNO_x$(m/hr))=−area velocity($A_v$(m/hr)
  *ln(1−$NO_x$ conversion/100), where the area velocity $A_v$ (m/hr)=Q (volumetric flow rate ($m^3$/hr))/$A_{cat}$ (catalyst surface area ($m^2$)).

It can be seen from these equations that the $kNO_x$ constant for a catalyst is independent of the pitch (or cells per square inch) of the honeycomb substrate monolith or a plate-type substrate and therefore also the volume of the honeycomb substrate monolith or a plate-type substrate.

In practice, it is desirable that the catalyst for converting ammonia in exhaust gas also containing oxygen to nitrogen and water, i.e. the ammonia slip catalyst (ASC), has as low a pressure drop as economically possible. This is because the addition of the ASC in the system creates additional pressure drop that requires additional energy input to accommodate, compared with the system including the SCR catalyst alone. This additional energy input can be important for gas turbine power generation as any additional energy demands in the system can reduce the efficiency of the power generation cycle as a whole.

An important component of pressure drop is the depth of the ASC bed. The depth of the ASC bed can be influenced, for example, by the temperature of operation, the kNOx and the pitch (or honeycomb cell density) of the substrate monolith comprising the ASC. So, for example, for a fixed ASC pitch, by lowering the kNOx, the more geometric ASC surface area—and therefore substrate monolith volume and resulting increased backpressure—is required to compensate.

Similarly, by lowering the pitch of the ASC substrate monolith, an increased catalyst volume would be required to compensate and maintain a fixed kNOx.

Therefore, depending on the location of the ASC in the system and the temperature of the catalyst in use, there is a balance to be struck between at least the pitch of the substrate monolith, the volume of the substrate monolith, the geometric surface area of the substrate monolith and the composition of the ASC, the selection of which parameters can be determined based on cost and operational considerations and are embraced generically by the kNOx.

The $kNO_x$ of the honeycomb substrate monolith or the plate-type substrate comprising the catalyst can be less than or equal to about 300 m/hr.

Preferably, the kNOx of the honeycomb substrate monolith or the plate-type substrate comprising the catalyst is about 90<kNOx<about 300 m/h between about 300 and about 400° C.

The catalyst for converting ammonia in exhaust gas also containing oxygen to nitrogen and water preferably converts about 70% $NH_3$ at above 250° C., more preferably >about 80% $NH_3$ at above about 300° C.

The catalyst for converting ammonia in exhaust gas also containing oxygen to nitrogen and water preferably has an sNOx=NOx out divided by ($NH_3$ in minus $NH_3$ out)<about 20% below about 400° C., more preferably an sNOx<about 10% below about 350° C., wherein the sNOx is determined using the same conditions defined for determining kNOx hereinabove.

The space velocity at which the exhaust gas contacts the retrofitted catalyst for converting ammonia in exhaust gas also containing oxygen to nitrogen and water can be from 50,000 to 500,000 $h^{-1}$ such as 100,000 to 400,000 $h^{-1}$ or 150,000 $h^{-1}$ to 350,000 $h^{-1}$.

The retrofitted catalyst for converting ammonia in exhaust gas also containing oxygen to nitrogen and water preferably comprises a platinum group metal supported on a refractory oxide support and a selective catalytic reduction catalyst.

The platinum group metal in the platinum group metal supported on a refractory oxide support is loaded to about 1 to about 40 g/ft$^3$, preferably about 1 to about 25 g/ft$^3$ or about 1 to about 10 g/ft$^3$. Lower platinum group metal loadings are preferred because such loadings promote selectivity for reaction (4).

The SCR catalyst in the retrofitted catalyst for converting ammonia in exhaust gas also containing oxygen to nitrogen and water can comprise (i) vanadia supported on titania in the anatase form and promoted with tungsta or molybdena; (ii) a metal promoted molecular sieve; or (iii) a mixture of vanadia supported on titania in the anatase form and promoted with tungsta or molybdena and a metal promoted molecular sieve.

Where the SCR catalyst in the retrofitted catalyst for converting ammonia in exhaust gas also containing oxygen to nitrogen and water comprises a metal promoted molecular sieve, preferably the molecular sieve is an aluminosilicate zeolite.

Preferably, where the SCR catalyst in the retrofitted catalyst for converting ammonia in exhaust gas also containing oxygen to nitrogen and water comprises a metal promoted molecular sieve, the molecular sieve has a maximum ring size of eight tetrahedral atoms and is further preferably selected from the group consisting of the Framework Type Codes CHA, AEI and AFX. Aluminosilicate zeolites that are particularly durable to hydrothermal ageing and hydrocarbon "coking" have a maximum ring size of eight tetrahedral atoms and are referred to in the art as "small pore" zeolites. Zeolites are categorised by the International Zeolite Association by their Framework Types. However, in certain applications where durability over an extended period is not a primary requirement, e.g. in relatively low temperature applications, "medium pore" zeolites, such as those having the Framework Type Codes MFI or FER or "large pore" zeolites, e.g. BEA or MOR, may be equally applicable.

A silica-to-alumina ratio (SAR) of the zeolite can be any appropriate SAR for promoting the reactions (1), (2) and (3). Generally, this is a balance between thermal stability on the one hand, wherein a relatively high silica content is preferred, and the promoting effect of an ion-exchanged transition metal, wherein a relatively high alumina content is preferred. In practice, the SAR selected may be dependent on the framework type code of the zeolite, but is typically within the range of about 10 to about 256, with SAR of about 15 to about 40 preferred for small pore zeolites such as CHA, AEI and AFX.

Preferably, the metal in the metal promoted molecular sieve is copper and/or iron.

The refractory oxide support for the platinum group metal in the SCR catalyst in the retrofitted catalyst for converting ammonia in exhaust gas also containing oxygen to nitrogen and water can be silica-doped alumina, titania or optionally doped zirconia.

The honeycomb substrate monolith or the plate-type substrate in the SCR catalyst in the retrofitted catalyst for converting ammonia in exhaust gas also containing oxygen to nitrogen and water has an axial length and can be coated with a first washcoat layer comprising the platinum group metal supported on a refractory oxide support and a second washcoat layer comprising the SCR catalyst.

The first washcoat layer can be disposed in a first zone coated from a first end of the honeycomb substrate monolith and the second washcoat layer can be disposed in a second zone coated from a second end of the honeycomb substrate monolith or the plate-type substrate, wherein the second layer is disposed upstream from the first layer.

Alternatively, the first zone is less than the axial length of the honeycomb substrate monolith or the plate-type substrate and the second layer of the second zone at least partially overlies the first layer. In this case, preferably the second layer can extend to the entire axial length of the honeycomb substrate monolith or the plate-type substrate.

Alternatively, the first layer can extend to the entire axial length of the honeycomb substrate monolith or the plate-type substrate and the second layer can overlie the first layer and can extend to the entire axial length of the honeycomb substrate monolith or the plate-type substrate.

Preferably, the proscribed limit for NOx emissions in the method according to the invention is less than or equal to 2 ppm and/or the proscribed limit for ammonia emissions is less than or equal to 10 ppm, such as less than 5 ppm or less than 2 ppm.

The temperature at which the exhaust gas contacts the SCR catalyst bed can be about 200° C. to about 450° C.

The nitrogenous reductant is ammonia ($NH_3$) per se, hydrazine or any suitable ammonia precursor, such as urea (($NH_2)_2CO$), ammonium carbonate, ammonium carbamate, ammonium hydrogen carbonate or ammonium formate. It is important that the mixing of ammonia and the exhaust gas is done as completely as possible before the exhaust gas/ammonia enters the SCR catalyst. This can be done using various baffles and static mixers having e.g. herringbone and skew channel shapes, as necessary provided that they do not significantly contribute to an increase in backpressure. Good mixing of ammonia and exhaust gas can be promoted by a thorough two dimensional coverage of reducing agent injection across a duct carrying the exhaust gas. Such arrangements are known in the art as ammonia injection grids (AIG).

In order to promote reaction (3) (and reactions (1) and (2) in addition), the alpha ratio of ammonia molecules to $NO_x$ molecules used in the reaction is preferably about 0.90 to about 2.00, preferably <about 1.8, such as about 0.95 to about 1.5 or 1.00 to about 1.20.

The SCR catalyst can be in the form of a washcoat that is coated onto a substrate, such as an inert ceramic honeycomb monolith, e.g. made from cordierite, or a metal monolith or it can be prepared as an extruded honeycomb body, wherein the catalyst is mixed with a paste of binder (or matrix) components and then extruded into the desired shape having flow channels extending therethrough. Washcoat compositions containing the zeolites for use in the present invention for coating onto the monolith substrate or manufacturing extruded type substrate monoliths can comprise a binder selected from the group consisting of alumina, silica, (non-zeolite) silica-alumina, naturally occurring clays, $TiO_2$, $ZrO_2$, and $SnO_2$.

In particular, the SCR catalyst can be any of those described for use in the catalyst for converting ammonia in exhaust gas also containing oxygen to nitrogen and water described hereinabove, i.e. one of:

(i) vanadia supported on titania in the anatase form and promoted with tungsta or molybdena;
(ii) a metal promoted molecular sieve; or
(iii) a mixture of vanadia supported on titania in the anatase form and promoted with tungsta or molybdena and a metal promoted molecular sieve.

The method according to the invention can be used to treat exhaust gas from any stationary source of $NO_x$ emission. In particular, the exhaust gas can be a product of a power station, an industrial heater, a cogeneration power plant, a combined cycle power generation plant, a wood-fired boiler, a stationary diesel engine, a stationary natural gas-fired engine, a marine propulsion engine, a diesel locomotive engine, an industrial waste incinerator, a municipal waste incinerator, a chemical plant, a glass manufacturing plant, a steel manufacturing plant or a cement manufacturing plant.

In a preferred application, the exhaust gas is a product of a cogeneration plant, preferably a stationary natural gas-fired engine.

Preferably, the exhaust gas aftertreatment system comprises a heat recovery steam generator (HRSG).

The term "comprising" as used herein can be exchanged for the definitions "consisting essentially of" or "consisting of". The term "comprising" is intended to mean that the named elements are essential, but other elements may be added and still form a construct within the scope of the claim. The term "consisting essentially of" limits the scope of a claim to the specified materials or steps and those that do not materially affect the basic and novel characteristic(s) of the claimed invention. The term "consisting of" closes the claim to the inclusion of materials other than those recited except for impurities ordinarily associated therewith.

For the avoidance of doubt, the entire contents of all documents cited herein are incorporated herein by reference.

Figure 2:
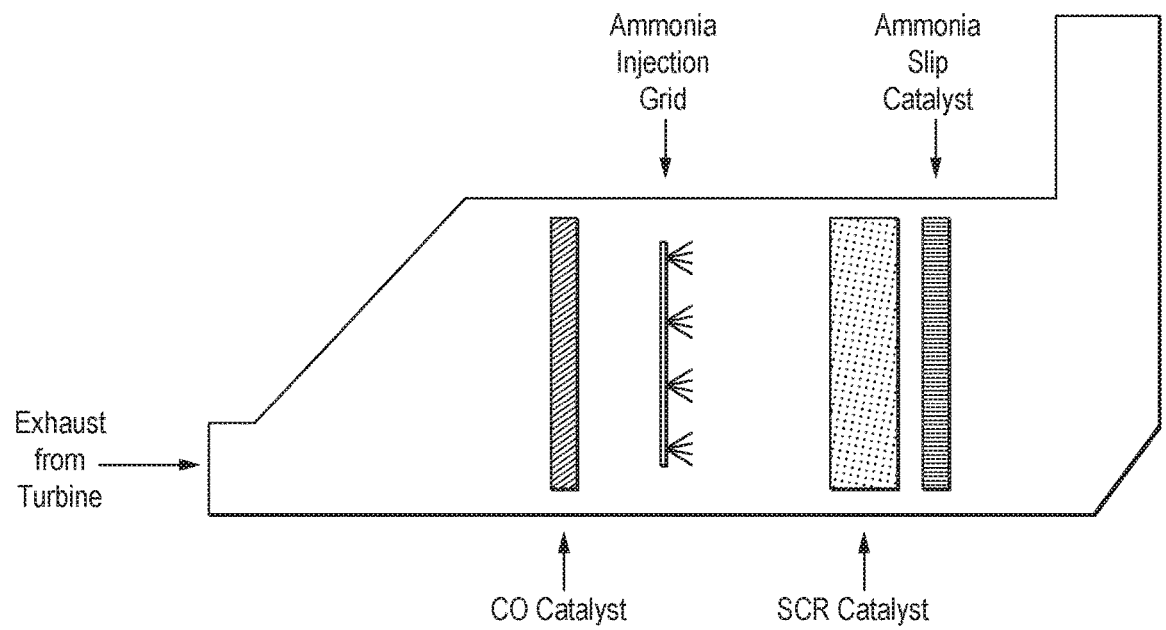

A prior art HRSG exhaust system for a gas turbine including a SCR catalyst is illustrated in the FIG. 1, which in FIG. 2 has been adapted to the method according to the present invention by insertion of an ammonia slip catalyst downstream of the SCR catalyst in the location illustrated. FIGS. 1 and 2 are self-explanatory.

In order that the invention may be more fully understood, the following Examples are provided by way of illustration only.

EXAMPLES

Example 1

A dual layered Ammonia Slip Catalyst (ASC) was prepared on a ceramic 230 cells per square inch (cpsi) honeycomb substrate monolith having 7 mil (thousandths of an inch) cell wall thickness. A first (lower) layer was coated directly onto the substrate having a continuous alumina washcoated layer along the entire axial length of the substrate. The resulting coated part was dried and calcined. Next Pt was impregnated into the washcoated alumina layer from a platinum nitrate solution to a loading of 5 g/ft$^3$ Pt. The resulting part was then dried and calcined. Finally, a second washcoat layer comprising Cu impregnated CHA zeolite mixed with binders was applied in a continuous layer covering 100% of Pt alumina layer along the entire axial length of the substrate and the resulting part was then dried and calcined. A cylindrical core of 2 inches in diameter and 3.3 inches in length was cut from the finished honeycomb substrate monolith coated with the dual layered ASC.

Example 2 (SCR Test)

The cylindrical ASC core of Example 1 was degreened at 450° C. in 10% $H_2O$ (as steam) in air for 48 hours then activity tested in a laboratory scale reactor for SCR activity. The gas composition fed to the catalyst for the activity test was 50 ppm CO, 30 ppm NO, 36 ppm $NH_3$, 15% $O_2$, 8% water, 3% $CO_2$, and balanced by $N_2$. CO, NOx, and $NH_3$ conversions were measured with the reactor held at steady state temperature points ranging from 200 to 450° C. The Gas Hourly Space Velocity (GHSV) over the ASC volume was 180,000 h$^{-1}$.

The CO conversion, NOx conversion, and $NH_3$ conversion are each shown in Table 1 for the various temperatures. The kNOx, defined as kNOx=−(Area Velocity)*ln (1−NOx Conversion/100), are also shown.

TABLE 1

| Temp ° C. | NO Conv (%) | CO Conv (%) | $NH_3$ Conv (%) | kNOx |
|---|---|---|---|---|
| 200 | 40 | 41 | 35 | 46 |
| 252 | 64 | 56 | 73 | 94 |
| 305 | 73 | 64 | 84 | 120 |
| 352 | 75 | 67 | 87 | 125 |

TABLE 1-continued

| Temp ° C. | NO Conv (%) | CO Conv (%) | NH$_3$ Conv (%) | kNOx |
|---|---|---|---|---|
| 402 | 71 | 70 | 87 | 113 |
| 452 | 59 | 73 | 86 | 80 |

Example 3 (NH$_3$ Oxidation Test)

The cylindrical ASC core of Example 1 was degreened at 450° C. in 10% H$_2$O in air for 48 hours then activity tested in a laboratory scale reactor for NH$_3$ oxidation activity. The gas composition fed to the catalyst was 50 ppm CO, 30 ppm NH$_3$, 10% O2, 4% water, 3% CO$_2$, and balanced by N$_2$. CO, NOx, and NH$_3$ conversions were measured with the reactor held at steady state temperature points ranging from 200 to 450° C. The Gas Hourly Space Velocity (GHSV) over the ASC volume was 120,000 h$^{-1}$.

The results show CO conversion and NH$_3$ conversion in Table 2. The sNOx, defined as (NOx out divided by (NH$_3$ in minus NH$_3$ out)), is also shown.

TABLE 2

| Temp ° C. | NH$_3$ Conv. (%) | CO Conv. (%) | sNOx (%) |
|---|---|---|---|
| 200 | 44 | 46 | 2 |
| 250 | 78 | 72 | 3 |
| 298 | 88 | 80 | 4 |
| 345 | 91 | 83 | 6 |
| 401 | 92 | 86 | 8 |
| 451 | 92 | 88 | 18 |

Example 4 (SCR Test w/High Ammonia to NOx Ratio (ANR))

The cylindrical ASC core of Example 1 was degreened at 450° C. with 10% H$_2$O in air for 48 hours then activity tested in a laboratory scale reactor for SCR activity. The gas composition fed to the catalyst for the activity test was 50 ppm CO, 30 ppm NO, 54 ppm NH$_3$, 15% O2, 8% water, 3% CO$_2$, and balanced by N$_2$. CO, NOx, and NH$_3$ conversions were measured with the reactor held at steady state temperature points ranging from 200 to 450° C. The Gas Hourly Space Velocity (GHSV) over the ASC volume was 180,000 h$^{-1}$.

The CO conversion, NOx conversion, and NH$_3$ conversion are shown in Table 1 for the various temperatures. The kNOx, defined as kNOx=−(Area Velocity)*ln(1−NOx Conversion/100), are also shown.

TABLE 3

| Temp ° C. | NO Conv | CO Conv | NH$_3$ Conv | kNOx |
|---|---|---|---|---|
| 200 | 46 | 46 | 30 | 56 |
| 253 | 67 | 59 | 70 | 101 |
| 305 | 73 | 66 | 81 | 120 |
| 353 | 76 | 69 | 86 | 128 |
| 402 | 73 | 71 | 87 | 118 |
| 452 | 63 | 74 | 88 | 90 |

The invention claimed is:

1. A method of extending the useful life of an aged selective catalytic reduction (SCR) catalyst bed, which catalyses the conversion of oxides of nitrogen (NO$_x$) to dinitrogen (N$_2$) in the presence of a nitrogenous reductant, in the exhaust gas after treatment system of a stationary source of NO$_x$ so that the exhaust gas emitted to atmosphere from the system continues to meet proscribed limits for both NO$_x$ and ammonia emissions, which method comprising the step of retrofitting a honeycomb substrate monolith or a plate-type substrate comprising a catalyst for converting ammonia in exhaust gas also containing oxygen to nitrogen and water downstream of the aged SCR catalyst bed, wherein a kNO$_x$ of the honeycomb substrate monolith comprising the catalyst for converting ammonia in exhaust gas also containing oxygen to nitrogen and water is greater than or equal to about 80 m/hr between about 250 and about 400° C. inclusive, wherein the kNOx of a sample of the catalyst, which has been aged at 450° C. in 10% H$_2$O (as steam) in air for 48 hours, is determined by a SCR activity test in a laboratory scale reactor using a gas composition of 50 ppm CO, 30 ppm NO, 36 ppm NH$_3$, 15% O$_2$, 8% water, 3% CO$_2$, balance N$_2$.

2. The method according to claim 1, wherein the kNO$_x$ of the honeycomb substrate monolith or the plate-type substrate comprising the catalyst is less than or equal to about 300 m/hr.

3. The method according to claim 1, wherein the kNOx of the honeycomb substrate monolith or the plate-type substrate comprising the catalyst is about 90<kNOx<about 300 m/h between about 300 and about 400° C.

4. The method according to claim 1, wherein the catalyst for converting ammonia in exhaust gas also containing oxygen to nitrogen and water has an sNOx=NOx out divided by (NH$_3$ in minus NH$_3$ out)<about 20% below about 400° C., wherein the sNOx is determined using the same conditions defined in claim 1 for determining kNOx.

5. The method according to claim 4, wherein the catalyst for converting ammonia in exhaust gas also containing oxygen to nitrogen and water has an sNOx<about 10% below about 350° C.

6. The method according to claim 1, wherein the space velocity at which the exhaust gas contacts the retrofitted catalyst for converting ammonia in exhaust gas also containing oxygen to nitrogen and water is from 50,000 to 500,000 h$^{-1}$.

7. The method according to claim 1, wherein the retrofitted catalyst for converting ammonia in exhaust gas also containing oxygen to nitrogen and water comprises a platinum group metal supported on a refractory oxide support and a selective catalytic reduction catalyst.

8. The method according to claim 7, wherein the SCR catalyst is one of (i) vanadia supported on titania in the anatase form and promoted with tungsta or molybdena (ii) a metal promoted molecular sieve; or (iii) a mixture of vanadia supported on titania in the anatase form and promoted with tungsta or molybdena and a metal promoted molecular sieve.

9. The method according to claim 7, wherein the molecular sieve has a Framework Type Code that is CHA, AEI, AFX, BEA, MOR, MFI or FER.

10. The method according to claim 7, wherein the metal in the metal promoted molecular sieve is copper and/or iron.

11. The method according to claim 7, wherein the honeycomb substrate monolith or the plate-type substrate has an axial length and is coated with a first washcoat layer comprising the platinum group metal supported on a refractory oxide support and a second washcoat layer comprising the SCR catalyst.

12. The method according to claim 11, wherein the first layer is disposed in a first zone coated from a first end of the honeycomb substrate monolith and the second layer is disposed in a second zone coated from a second end of the honeycomb substrate monolith or the plate-type substrate, wherein the second layer is disposed upstream from the first layer.

13. The method according to claim 12, wherein the first zone is less than the axial length of the honeycomb substrate monolith or the plate-type substrate and the second layer of the second zone at least partially overlies the first layer.

14. The A method according to claim 12, wherein the second layer extends to the entire axial length of the honeycomb substrate monolith or the plate-type substrate.

15. The method according to claim 11, wherein the first layer extends to the entire axial length of the honeycomb substrate monolith and the second layer overlies the first layer and extends to the entire axial length of the honeycomb substrate monolith or the plate-type substrate.

16. The method according to claim 1, wherein the temperature at which the exhaust gas contacts the SCR catalyst bed is about 200° C. to about 450° C.

17. The method according to claim 1, wherein the nitrogenous reductant is ammonia ($NH_3$).

18. The method according to claim 1, wherein an alpha ratio of ammonia molecules to $NO_x$ molecules contacting the aged SCR catalyst bed is about 0.90 to about 2.00.

19. The method according to claim 1, wherein the stationary source of $NO_x$ is a power station, an industrial heater, a cogeneration power plant, a combined cycle power generation plant, a wood-fired boiler, a stationary diesel engine, a stationary natural gas-fired engine, a marine propulsion engine, a diesel locomotive engine, an industrial waste incinerator, a municipal waste incinerator, a chemical plant, a glass manufacturing plant, a steel manufacturing plant or a cement manufacturing plant.

20. The method according to claim 19, wherein the exhaust gas after treatment system comprises a heat recovery steam generator (HRSG).

21. The method according to claim 1, wherein the SCR catalyst is a washcoat coated onto a substrate or is a component of an extruded honeycomb body.

22. The method according to claim 21, wherein the SCR catalyst is one of:
  i. vanadia supported on titania in the anatase form and promoted with tungsta or molybdena;
  ii. a metal promoted molecular sieve; or
  iii. a mixture of vanadia supported on titania in the anatase form and promoted with tungsta or molybdena and a metal promoted molecular sieve.

* * * * *